United States Patent [19]
Glucksman

[11] Patent Number: 5,168,794
[45] Date of Patent: Dec. 8, 1992

[54] APPARATUS FOR BREWING COFFEE

[76] Inventor: Dov Z. Glucksman, 137 Larch Row, Wenham, Mass. 01984

[21] Appl. No.: 636,137

[22] Filed: Dec. 31, 1990

[51] Int. Cl.⁵ .................... A23F 00/00; A47J 31/00
[52] U.S. Cl. ............................ 99/295; 99/299; 99/305; 99/317
[58] Field of Search ......... 99/279, 280, 282, 293–295, 99/298–300, 304–307, 316, 317, 281, 283; 426/433

[56] References Cited

U.S. PATENT DOCUMENTS

| | | | |
|---|---|---|---|
| 1,778,792 | 10/1930 | Cameron | 99/284 |
| 2,835,782 | 5/1958 | Stiebel | 99/305 |
| 3,080,810 | 3/1963 | Saint | 99/306 |
| 3,333,527 | 8/1967 | Bender | 99/299 |
| 4,613,745 | 9/1986 | Marotta et al. | 99/282 |
| 4,713,253 | 12/1987 | Stone | 99/299 |
| 4,790,240 | 12/1988 | Henn et al. | 99/282 |
| 4,793,245 | 12/1988 | Kimura | 99/292 |
| 4,893,552 | 1/1990 | Wunder et al. | 99/299 |
| 4,998,463 | 3/1991 | Precht et al. | 99/293 |
| 5,049,713 | 9/1991 | Creyaufmüller | 99/306 |
| 5,070,773 | 12/1991 | Salomon et al. | 99/307 |

FOREIGN PATENT DOCUMENTS 0688175 9/1979 U.S.S.R. ................. 99/300

Primary Examiner—Harvey C. Hornsby
Assistant Examiner—James F. Hook
Attorney, Agent, or Firm—Charles R. Miranda

[57] ABSTRACT

Apparatus for brewing coffee having a heating compartment provided with water at various predetermined levels depending upon the number of cups of brewed coffee desired. A U-shaped syphon tube is provided in the heating compartment and is arranged so that the water level in the heating compartment is always below the top of the bight portion of the tube prior to being heated to a predetermined temperature. When the pressure within the heating compartment reaches a predetermined discharging value, water at the proper temperature in the heating compartment is caused to discharge through the syphon tube and out of the compartment. A pressure vent, having an orifice exposed to the pressure within the heating compartment, serves to delay the attainment of the discharging pressure until the water reaches the proper temperature. A water holding compartment is disposed to receive the water from the heating compartment and is provided with a flow meter to regulate the flow of water from the holding compartment into a brewing compartment for soaking contact with a bed of coffee grounds therein. The rate of flow of water into the coffee brewing compartment is controlled in conjunction with outflow outlets in the compartment to maintain a level of water sufficient to cover the bed of coffee grounds for a period of brewing time and for a wide range of cups of coffee to be brewed.

9 Claims, 6 Drawing Sheets

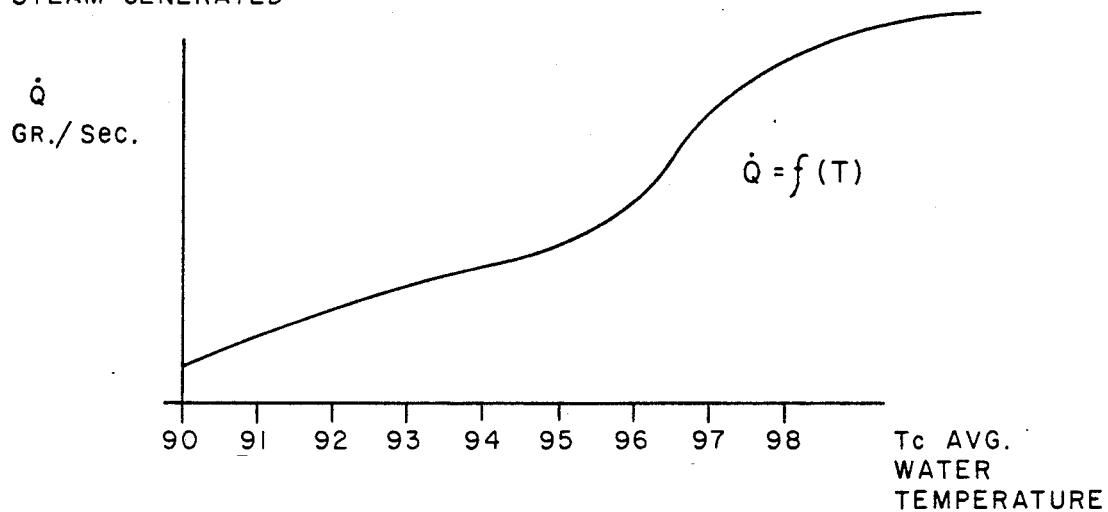
FIG. 8
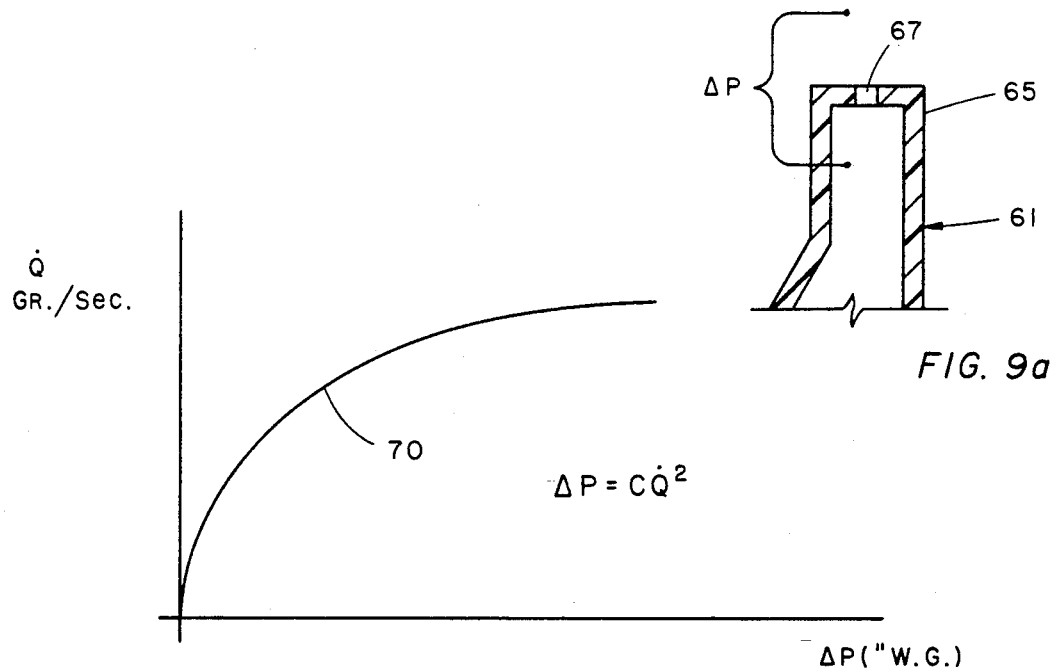
FIG. 9a
FIG. 9

APPARATUS FOR BREWING COFFEE

BACKGROUND OF THE INVENTION

The present invention relates to coffeemakers or apparatus for brewing coffee and more particularly to automatic controlled flow type coffeemakers.

DESCRIPTION OF THE PRIOR ART

It has been the experience of coffee connoisseurs throughout the world that the best way for brewing coffee is achieved by using the following method:
1) Placing a predetermined amount of coffee grounds in a conical or basket shape paper filter.
2) Bringing water to a temperature of 90°-95° C.
3) Quickly pouring a portion of water into the coffee grounds which is in the paper filter to obtain a well mixed slurry of coffee grounds and water.
4) Slowly continuing to replenish the water, which drips out of the bottom of the filter to maintain a constant mixture until all the water flows out.
5) Waiting until the entire quantity of water has flowed through the bed of coffee grounds and extracted the flavorful elements from the coffee.

In accordance with the above procedure the following is achieved:
A) The coffee grounds are all evenly dispersed in the water for almost the entire brewing process.
B) Variation in brewing time from four cups to twelve cups can be kept to a minimum.
C) The brewing temperature remains constant for a major portion of the process.
D) Maximum filter area utilization is achieved since the appropriate water level is maintained for as long a time as possible.

Until this time, the method could be achieved only by a user physically observing the water level and maintaining it by slowly pouring water from a kettle, being held over the filter.

Automatic drip coffeemakers, currently on the market operate in the following manner: cold water is stored in a reservoir which communicates with a through-flow heater located below the reservoir. When the through-flow heater is energized, water inside is heated and starts to form steam bubbles which rise in a tube to the top of the coffeemaker. Each steam bubble "carries" with it a certain amount of water which is heated through contact with the steam bubbles. When the bubbles reach the top of this pipe, they drop as a narrow stream of hot water onto the coffee grounds in the filter. The water slowly soaks most of the coffee grounds and extracts the flavorful oils from it.

Three basic problems are associated with the foregoing method:
1) The coffee grounds temperature rises slowly since only a low rate of water flow is produced by the through-flow heater.
2) Uneven utilization of coffee grounds: over-extraction in the center where the stream of water flows, under extraction on the sides where contact with the water is only minimal.
3) Only a small portion of the filter paper area is used, thereby reducing its filtering effectiveness.

Many attempts have been made to overcome the problems associated with automatic drip coffeemakers, and to simulate the mentioned "manual" method. Such attempts are shown in U.S. Pat. Nos.: 4,784,051; 4,478,139; 4,602,145; 4,819,553; 4,621,571; 4,622,230; 3,693,535; 4,721,508; and 4,000,396.

U.S. Pat. Nos. 4,713,253; 4,784,051, and German patent DE3312354C2 all disclose coffeemakers utilizing a syphon tubes similar to that used in the present invention. Moreover, U.S. Pat. No. 4,713,253 further discloses an overflow standpipe to limit the head pressure in a transfer tank. However, it will be evident upon examination of the invention to be described hereinafter that although these patents are of some interest, clearly they do not disclose nor anticipate the following invention.

SUMMARY OF THE INVENTION

It is an object of the present invention to provide a novel coffeemaker which automatically provides for even dispersion of coffee grounds in water during the brewing process, and the maintenance of a substantially uniform and constant brewing time and temperature, while utilizing a maximum filter area.

It is another object to provide a coffeemaker which utilizes novel structure for discharging heated water from a heating compartment only upon attainment of a predetermined temperature of the water suitable for brewing coffee.

Another object is to provide novel pressure venting means which prevents the brewing of coffee with water that is at a lower temperature than a desired temperature for brewing.

Still another object is to provide a novel flow metering means which provide for a variable and controlled flow of water into contact with a bed of coffee grounds, and in conjunction with variable outlet means in a coffee brewing compartment to maintain a desired ratio of water to coffee grounds during the brewing process over a wide range of cups of coffee to be brewed.

A still further object is to provide novel means which permit alternative preparation of a small or a large number of cups of coffee, of the same good quality, within a time period acceptable to consumers of the brewed coffee.

In accordance with the present invention a coffeemaker is provided which comprises a heating or boiling compartment, a water holding compartment and a brewing compartment. The heating compartment is substantially sealed by a removable cap and is filled with a variable quantity of water, depending upon the number of cups of coffee desired. Electrical heating means is provided which imparts heat to the water to bring the water to a desired temperature. Discharge means, in the form of a U-shape syphon tube is located in the heating compartment and has one end in communication with the water within the heating compartment and its other end in communication with the water holding compartment which is at atmospheric pressure. When the water reaches a predetermined temperature of approximately 90°-95° C., the differential pressure, that is, the pressure within the heating compartment acting against the pressure within the water holding compartment, causes the water to be discharged through the syphon tube into the water holding compartment. Pressure venting means in the form of a tubular member serves to delay and bleed off the pressure within the heating compartment until the water reaches the predetermined temperature. The tubular member is provided at one end, above the level of the water in the heating compartment, with a venting orifice or aperture through which steam and air from the heated water flows through the tubular member into the water holding compartment.

To provide for a quick initial quantity of water from the water holding compartment to flow into the brewing compartment sufficient to cover the bed of coffee grounds therein, novel flow metering means are disposed in the water holding compartment. In addition, the metering means also provides for a regulated flow of a "replenishing" stream of water to the brewing compartment, which in conjunction with outflow apertures or orifices in the brewing compartment maintain a desired level of water covering the bed of coffee grounds during most of the brewing process. The metering means takes the form of orifices, which in the embodiments of the invention disclosed herein, are apertures formed in the floor of the holding compartment, and upstanding pipe(s) dimensioned and configured to receive water at varying levels in the water holding compartment and to discharge such water into the brewing compartment. The brewing compartment contains a filter holder which holds a cup shaped permeable coffee filter paper. Depending upon the number of cups of coffee to be brewed, the level of the bed of coffee grounds in the filter will correspondingly vary and the flow of water from the water holding compartment will be varied in accordance with such coffee bed level. The outflow apertures or orifices are provided in the filter holder and are dimensioned to permit discharge of brewed coffee therefrom at a flow rate proportional to the flow rate through the metering means, to maintain a desired level of water within the filter.

Several embodiments of flow metering means in the water holding compartment are disclosed herein, all of which embody the same novel concept of controlling and varying the flow rate of water from the holding compartment by appropriate and aggregate orifice or opening areas presented to the water within the water holding compartment in conjunction with the outflow orifices in the brewing compartment. This provides for a proper ratio of coffee grounds to water, at the proper brewing temperature, which is critical for the "good" cup of coffee desired by coffee connoisseurs.

BRIEF DESCRIPTION OF DRAWINGS

FIG. 8 is a graph showing the relationship between the grams per second (Q) of steam generated and the temperature of the water in the heating compartment;

FIG. 9 is a graph showing the relationship between the grams per second (Q) of steam generated and the differential pressure ($\Delta P$) across the pressure venting means of the present invention;

FIG. 9A is an enlarged fragmentary view of the pressure venting orifice, in which the differential pressure across the orifice follows the curve in FIG. 9;

DETAILED DESCRIPTION OF THE DRAWINGS

Figure 1:
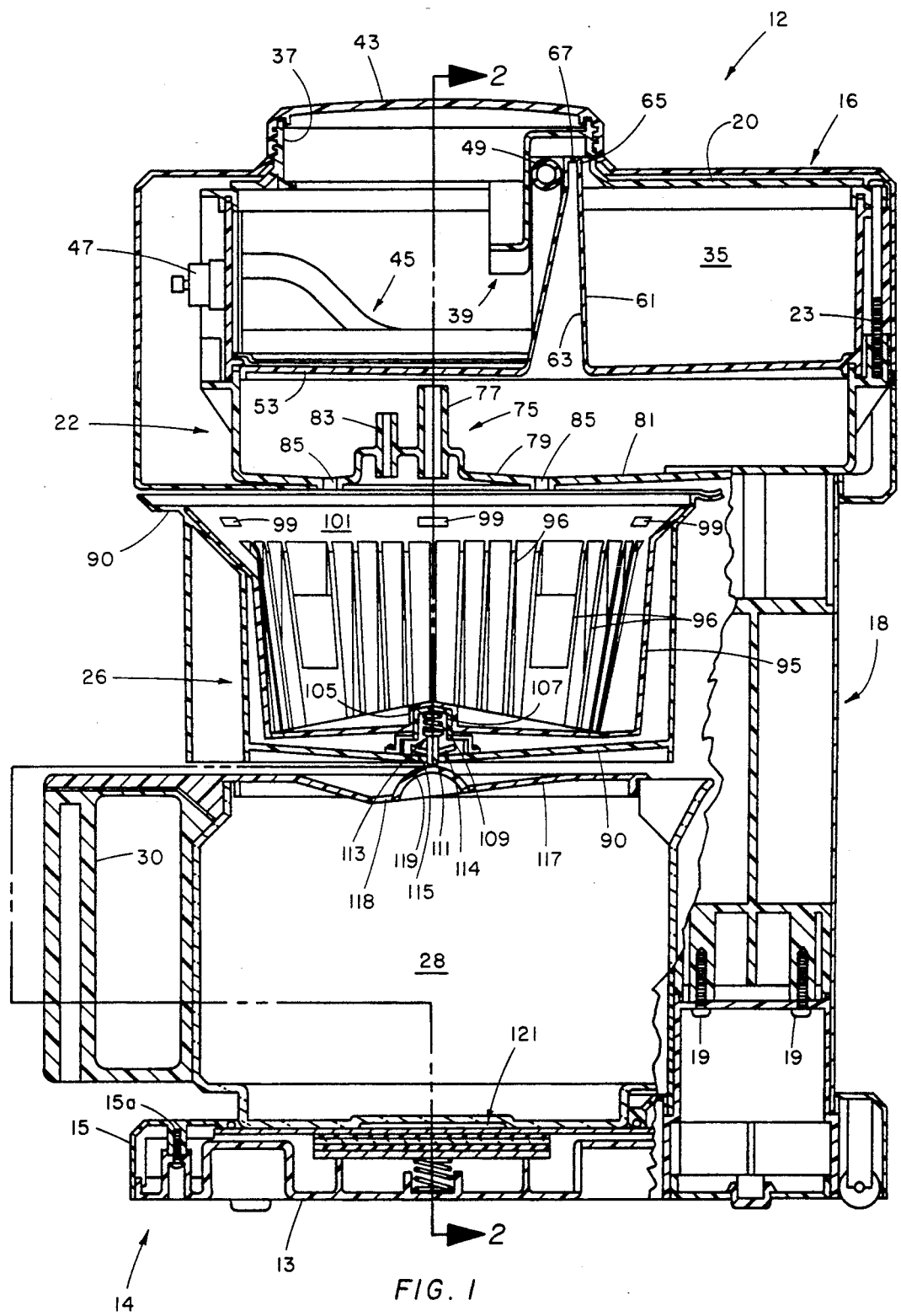
FIG. 1 is an elevational view, partly in section, of a coffeemaker embodying the present invention.

Referring now to the drawings for a more detailed description of the present invention, and more particularly to FIG. 1 hereof, an automatic controlled flow type coffeemaker is generally designated by the reference character 12 and includes a base 14 comprising a lower plate 13 and an upper plate 15 secured together by threaded members 15 A. A top 16 is supported on base 14 by columns, generally designated by the numeral 18, which are secured to base 14 by threaded members 19. Top 16 includes a section or heating or boiling compartment 20, and a second section or water holding compartment 22, secured together by threaded members 23. Disposed immediately below water holding compartment 22 is a removable coffee brewing compartment 26. A carafe 28, which may be of transparent glass or other suitable material, is seated on base 14 and is provided with a handle 30.

Figure 2:
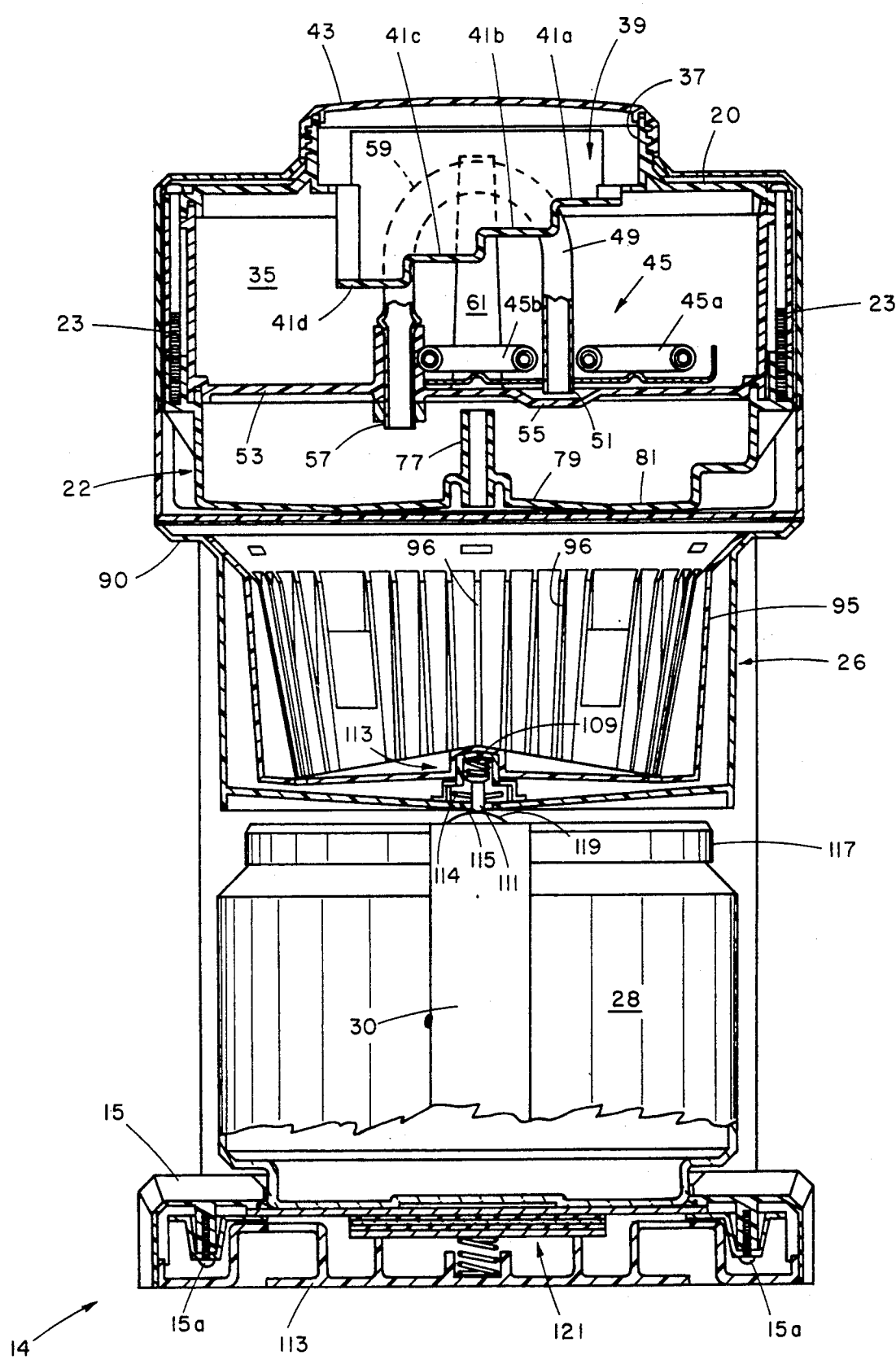
FIG. 2 is a sectional view of the coffeemaker of FIG. 1, taken along the line 2—2 of FIG. 1.
Figure 3:
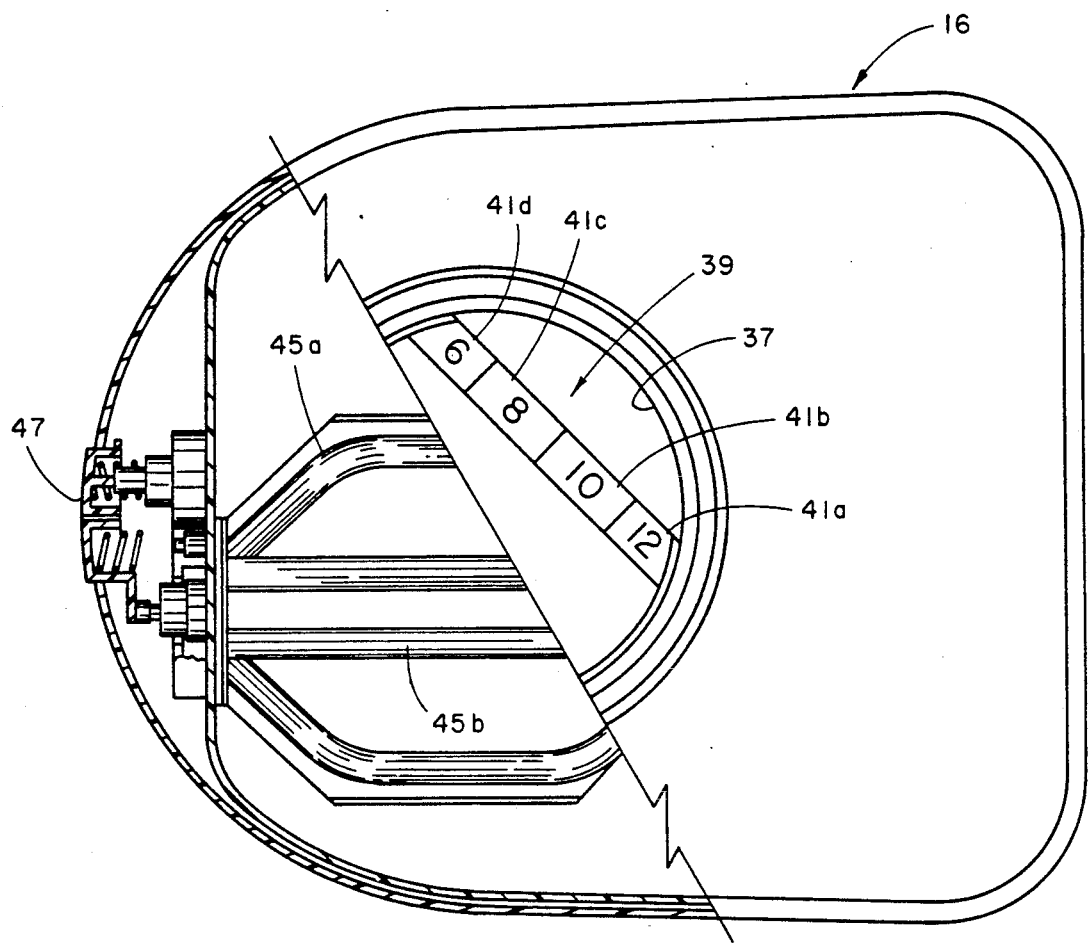
FIG. 3 is a top plan view of the coffeemaker of FIG. 1, with the screw cap removed to show the cups-of-water measuring indicator; moreover part of the top is broken away to disclose portions of the heating element.

Heating compartment 20 has a chamber 35 and an opening 37 at the top thereof through which is poured water for eventual coffee brewing. Disposed below the opening 37 and visually accessible therethrough, is a cup-of-water level indicator 39 having vertically stepped portions 41a, 41b, 41c and 41d (FIG. 2) upon which reference characters are shown representing the number of cups of coffee to be brewed. A removable threaded cap 43 covers the opening 37, and when tightened to the position shown in FIGS. 1 and 2, hermetically seals or makes substantially airtight, chamber 35 of heating compartment 20. A tubular electrical heater 45 having sections 45a and 45b, is horizontally disposed within chamber 35 and is energized by connection to an electric power source (not shown), when a spring biased push button switch 47 is depressed. A U-shaped syphon tube 49 (best shown in FIG. 2) is seated in chamber 35 and has one end 51 located adjacent the floor 53 of chamber 35, in a depression 55 formed in the floor, and the other end 57 of tube 49 is seated in floor 53 to project into and in communication with water holding compartment 22. Tube 49 has a bight portion 59 which extends upwardly and in proximity to the opening 37 at the top of chamber 35. Extending upwardly from the floor 53 of chamber 35 is a pressure venting tube 61, which is better seen in FIG. 1, is of larger cross sectional area at the base or end 63, than at its upper end 65. An orifice 67 is provided at end 65 and communicates with the interior of chamber 35; while end 63 is sealed from chamber 35 but in communication with water holding compartment 22 which is not sealed, and thusly, is at the pressure of the room in which the coffeemaker is used.

One of the objects of the present invention is to provide water to be brewed at a desired temperature, which most coffee connoisseurs consider to be within the range of 90° C. to 95° C. In the use of the U-shaped syphon tube, such as the tube 49, shown in the present invention, water in a heating compartment is brought to an appropriate level below the bight portion of the tube. As the water is heated, the pressure within the heating compartment commences to rise, and at a certain differential discharging pressure, the water within the compartment is rapidly forced upwardly through the syphon tube and into the water holding chamber. In some prior art coffeemakers, the discharging pressure occurs at a point when the temperature of the heated water to be discharged is less than that desired. Accordingly, the heated water projected onto the coffee grounds, produces coffee which is not as palatable, as desired.

The structure described to this point overcomes this problem, among others, in a novel manner insofar as the structure delays the pressure within chamber 35 reaching the discharging value until the heated water reaches the proper temperature that is, within the range of 90° C. to 95° C. For a better understanding of how this is achieved, it would be well to explain the process which takes place within the heating compartment 20 when heat is imparted to the water to heat same to a predetermined temperature. Steam bubbles form on the surface of the heater and begin to rise through the water. As the bubbles rise, they impart energy to the cooler water, which is thereby heated. As the water approaches its proper predetermined temperature, the temperature difference between the steam bubbles and the rest of the water diminishes, and therefore, more and more steam emerges from the surface of the water, as shown in the graph of FIG. 8. In effect, the amount of steam generated is a function of the temperature of the water being heated. Thus, as the temperature of the water increases, the quantity of steam increases in a near linear manner, as seen in FIG. 8, until a temperature of approximately 96° C. is reached and the relationship becomes non-linear. Pressure venting tube 61 makes use of the foregoing process by providing orifice 67 above the level of water in the heating compartment. As indicated hereinbefore, the end 63 of tube 61 is in communication with the water holding compartment 22 so that orifice 67 is exposed to a differential pressure between that of heating compartment 20 and that of water holding compartment 22. As the temperature of the water in heating compartment 20 increases, the amount of steam generated correspondingly increases and orifice 67 initially permits escape of steam to vent the pressure within the compartment 20. However, as the process continues, eventually all of the steam cannot escape because of the dimensions of orifice 67. As a result, the pressure rises in compartment 20 to a point where it reaches the "discharge" value to force the heated water past bight portion 59, to thereby rapidly empty the heated water from compartment 20 into compartment 22. The foregoing may be graphically seen from FIG. 9 wherein the curve 70 follows the formula $\Delta P = CQ^2$: C being a constant which is proportional to the diameter of orifice 67 and to the density of the steam. The pressure rise in compartment 20 is proportional to the square power of the steam trying to escape through orifice 67. Since Q is a function of the average temperature of the water, the differential pressure is proportional to the geometry of U-shaped syphon tube 49, which is constant. In following the principles of the present invention, the temperature of the water at which it leaves the heating compartment through tube 49, may be varied by changing the value of "C" in the formula above, or as more specifically described here, the diameter of orifice 67. Thus, it will be evident that the pressure venting tube, through the medium of the generated steam and the dimensioning of orifice 67, may modify the normal pressure-temperature relationship in a closed vessel wherein water is heated, to control the temperature at which water can be discharged from the heating compartment.

Water holding compartment 22 is designed to accommodate and hold heated water received from heating compartment 20 from under 4 cups of water to a maximum of 12 cups. However, the coffeemaker operates most efficiently and effectively when the number of cups of coffee to be brewed exceed 4 cups. Water holding compartment 22 includes a flow metering means 75 which functions initially to cause a large quantity of water to flow from compartment 22, and thereafter, to provide a smaller or lesser replenishing stream of water. Metering means 75 comprises an upstanding metering pipe 77, the upper end of which approaches but is spaced from floor 53 of heating compartment 20, and at its other end is secured to a raised portion 79 of floor 81 of compartment 22. Pipe 77 is hollow, and open at both ends, and has an internal diameter of a calculated predetermined dimension for a desired rate of flow of water therethrough. Also forming a part of metering means 75 is a second upstanding metering pipe 83, which is located adjacent to and is shorter than pipe 77; pipe 83 has a reduced internal diameter as compared to pipe 77. Arranged concentrically of pipe 77 are openings 85 in floor 81, and the openings constitute part of the metering means 75. As may be understood from FIG. 1, when a quantity of heated water from heating compartment 20, which corresponds to 12 cups of coffee, enters compartment 22 the level of water rises above the top of pipe 77. At this point in time, water will be flowing out of compartment 22 through pipes 77 and 83, as well as through openings 85, to provide a high rate of flow. As the level of water flows below the top of pipe 77 to flow only through pipe 83 and openings 85, the flow of discharging water will be considerably reduced. As the level of water falls below the top of pipe 83, the flow will be substantially reduced to a trickle, insofar as the water will be flowing only through openings 85.

Figure 5:
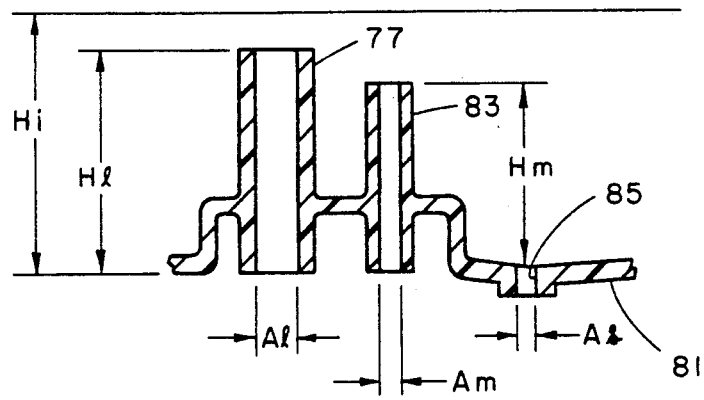
FIG. 5 is a fragmentary view of the metering means of the water holding compartment enlarged to illustrate the principle upon which said means operates.
Figure 6:
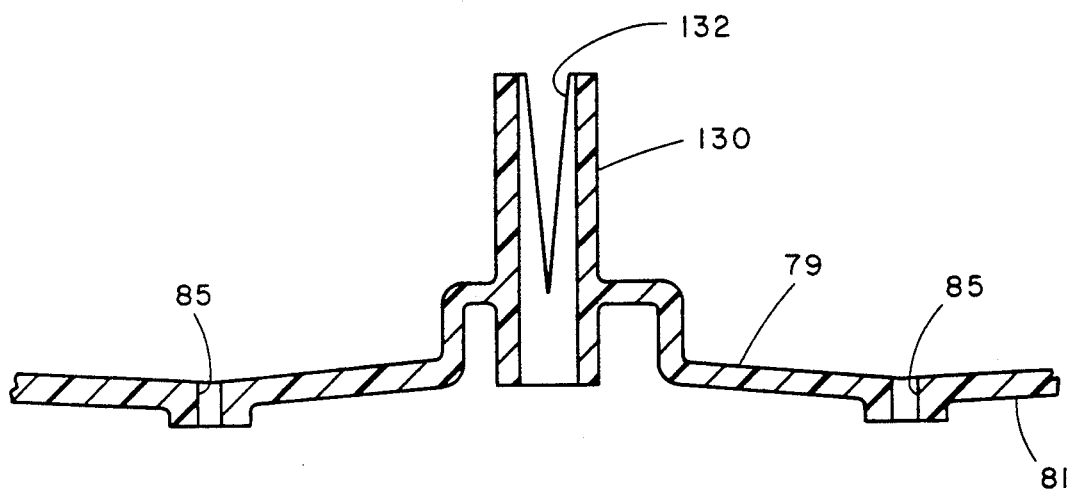
FIG. 6 and 7 are other embodiments of the metering means.

Metering means 75 has been designed and calculated in accordance with the following flow rate formula and the underlying concept will be best understood by reference to FIGS. 5 and 6. The flow rate formula is as follows:

Where flow rate out of holding chamber $Q = \Sigma K(V \times A)$

Where K is a constant = (0.8–0.9)
V = water velocity
A = cross sectional area of pipe.
Since $V = Cx(H)^{\frac{1}{2}}$
Where C = constant,
H = specific height.
Thus the flow rate at any time equals $$Q = K[A_S \times (H_i)^{\frac{1}{2}} + A_m \times (H_i - H_m)^{\frac{1}{2}} + A_L \times (H_i - H_L)^{\frac{1}{2}}]$$

$A_S$ = is the area of orifices 85;
$A_m$ = is the area of the internal opening in pipe 77;
$A_L$ = is the area of the internal opening in pipe 83;
$H_i$ = the height of the maximum level of water (12 cups) contemplated for a 12 cup capacity coffeemaker;
$H_m$ = the height of the upper or inlet end of pipe 77, as measured from its outlet end; and $H_L$ = the height of the upper or inlet end of pipe 83 as measured from its outlet end.

Figure 10:
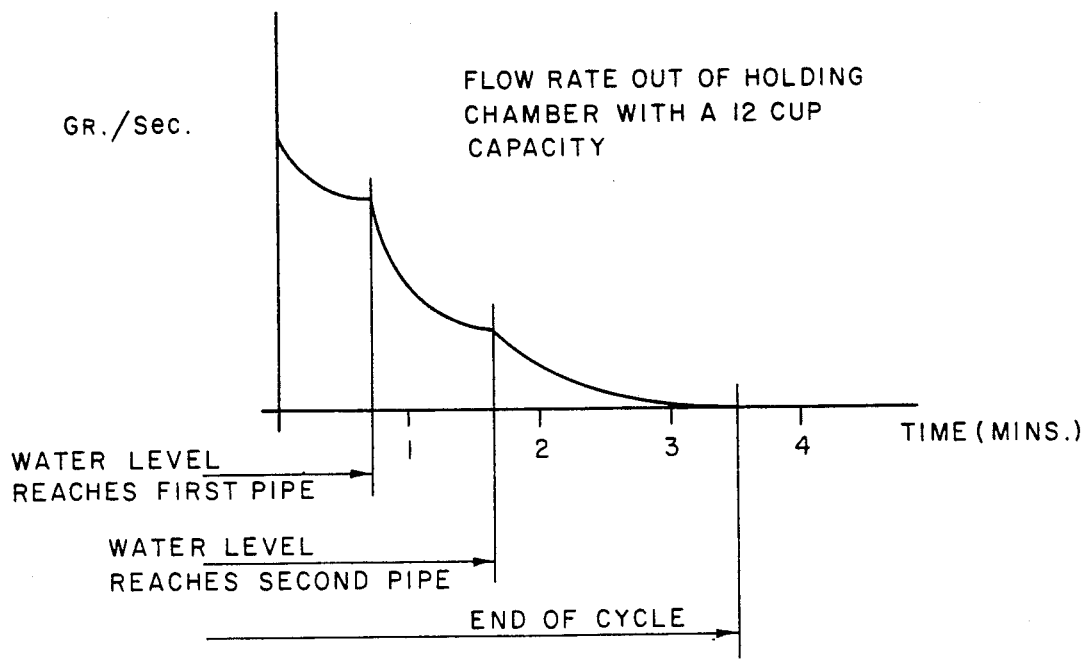
FIG. 10 is a graph showing the relationship between the flow rate in grams/sec. of the water as it flows out of the water holding compartment and the elapsed time for a 12 cup condition.

As may be understood from FIG. 10, the flow rate of water from the water holding compartment, assuming 12 cups of water therein, is such as to cause the water level $H_i$ to reach the inlet end of pipe 77 or $H_i$ in less than one minute, to reach the inlet end of pipe 83 or level $H_m$ in under two minutes, and in about three and one half minutes to empty completely through orifices 85. From the foregoing, it is evident that the greatest flow rate, and the largest quantity of water from water holding compartment 22, takes place in less than a minute and the flow thereafter is at a substantially lower rate, especially after the water level goes below the upper end of pipe 77.

Figure 4:
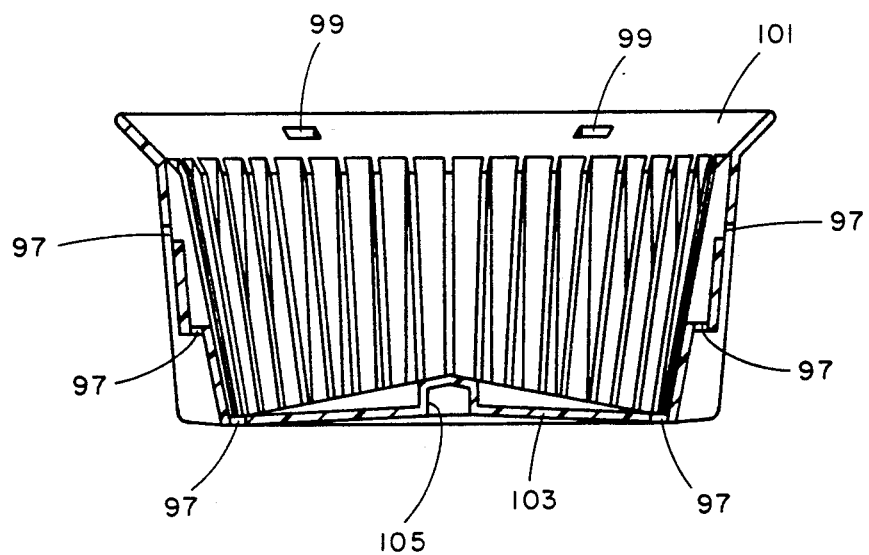
FIG. 4 is a sectional view, in elevation, of the filter holder of FIGS. 1 and 2 and showing in particular, the outflow orifices or apertures therein.

Coffee brewing compartment 26 is designed to accommodate coffee grounds (not shown) in an amount up to that which will brew 12 cups of coffee. Obviously, the greater the number of cups of coffee to be brewed the higher the level of the bed of coffee grounds and the amount thereof in compartment 26. Compartment 26 includes a removable tray member 90 which is constructed for sliding movement into the space between the water holding compartment 22 and the carafe 28 by means of structure not shown. A filter holder 95 is carried by tray 90 and may be removed therefrom when tray 90 is withdrawn. Filter holder 95 is constructed to accommodate and hold a standard and well known permeable cup shaped filter paper (not shown) which is supported by ribs 96, whereby water may easily pass through the filter paper into the filter holder 95. A series of vertically spaced outflow openings 97 are provided in filter holder 95 (FIG. 4) and are arranged in the periphery thereof. Additional openings 99 are provided in the rim 101 of coffee holder 95 to cause water to bypass the filter in the unlikely event more water than contemplated for normal usage is poured into the coffeemaker 12. Filter holder 95 is provided centrally, in floor 103 thereof, with a recessed portion 105 which adapted to seat on a sleeve 107 (FIG. 1) which accommodates one end of a spring 109. The other end of the spring engages a valve stem 111 of a valve 113 having a plate 114 which normally covers and seats against an opening 115 in the floor of tray 90. A cover 117, for carafe 28, is provided with an opening 118 and with a semi-spherical projection 119 which engages valve stem 111 when carafe 28 is placed on base 14 of coffeemaker 12; engagement of the projection 119 with stem 111 unseats the plate 114 to uncover opening 115 in tray floor 90 to provide for flow of coffee through opening 118 into carafe 28. An electrical heater element 121 is provided in base 14 to maintain the contents of carafe 28 in a heated condition when the carafe contains brewed coffee.

Figure 11:
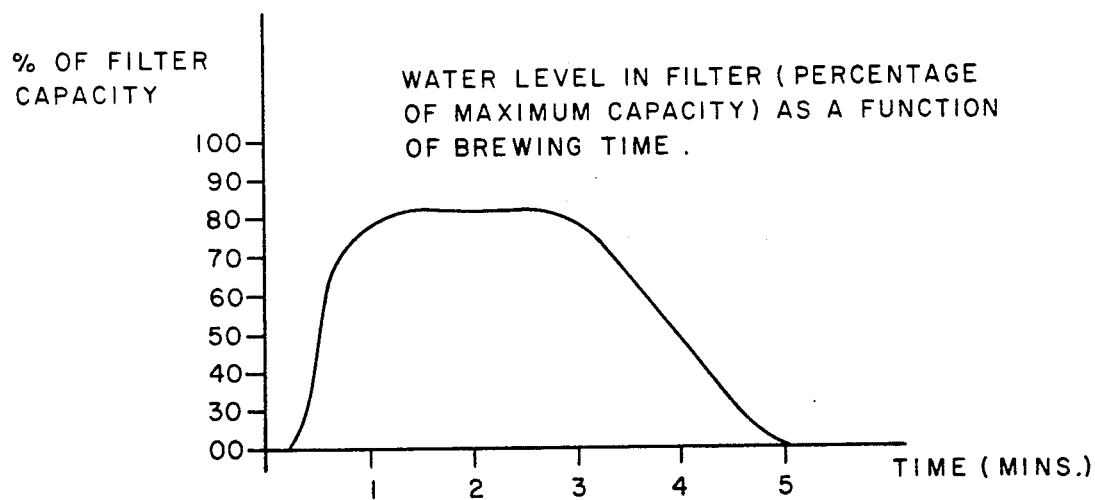
FIG. 11 is a graph showing the water level in the coffee brewing compartment in terms of percentage of filter capacity plotted against time.

The present invention provides for a coordinated relationship between the metering means 75 in water holding compartment 22, the outflow openings 97 in filter holder 95, and the bed level or amount of coffee within the filter paper (not shown). As indicated earlier in the description herein, a principal object of the present invention is to provide a proper ratio of coffee grounds to heated water in the coffee brewing compartment. This requires covering the coffee bed with water for a prolonged and predetermined period of time to maintain a slurry-like mixture to maximize the extraction of the favorable flavors from the coffee grounds. If 12 cups of coffee were to be brewed, the level of the bed of coffee grounds would extend above the highest level of outflow openings 97 in filter 95. Correspondingly, the quantity of water flowing from water holding compartment 22 would almost immediately rise above the coffee bed level and totally immerse all of the coffee grounds. In this condition, brewed coffee leaving the filter would exit from filter holder 95 through all of the outflow openings 97, at all levels. After the initial period, a replenishing stream of water would continue to come from compartment 22 to maintain the level of water above the bed of coffee grounds. Eventually, as the flow rate of the stream of water issuing from compartment 22 becomes less than the flow rate through outflow openings 97, the level of water in contact with the coffee bed will progressively lessen, to fall below the highest vertical level of outflow openings 97, thence to the next level of openings, and finally only through the lower most openings 97 in the floor of filter holder 95. The residence time of contact of the heated water in contact with the bed of coffee grounds is graphically illustrated by the graph in FIG. 11.

From the foregoing, it may be understood that the outflow openings 97 in filter holder 95 cooperate with the metering means 75 in compartment 22 to control and maintain a level of water in contact with the bed of coffee grounds for a predetermined residence time of contact. If for example, the number of cups of coffee to be brewed is less than 12, than the foregoing process will be substantially the same, except that the metering pipe 77 may not be brought into operation nor the highest vertical level of outflow openings 97. As is obvious, the metering means 75 and the outflow openings 97 that will be effective, will depend upon the number of cups of coffees to be brewed.

Figure 7:
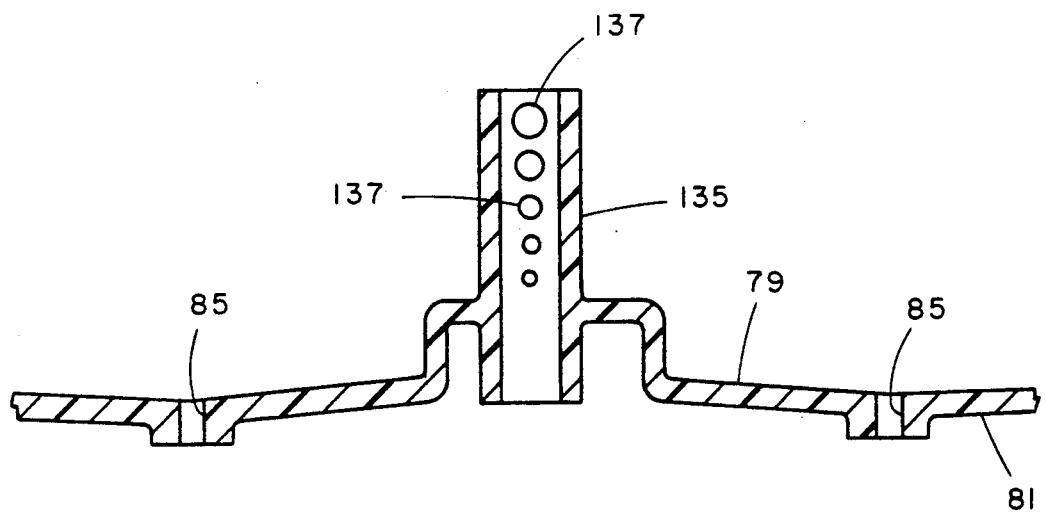

The present invention contemplates other forms, configurations, and numbers, of metering pipes so long as the same principle is followed. By this is meant that the flow rate of water leaving compartment 22 must be greatest when the water level in the compartment is the highest; this of course corresponds to the greatest number of cups of coffee to be brewed. As the water level is reduced in compartment 22 so would the rate of flow of water from compartment 22 be correspondingly reduced. FIGS. 6 and 7 show two additional and different embodiments of metering tubes. In FIG. 6, a metering pipe 130 is disclosed which is provided with a V-shaped slot 132 wherein the widest portion of the V is at the top of pipe 130, and the V progressively narrows as it extends in a direction away from the top of the pipe. In this embodiment of FIG. 6 the same or corresponding effect is obtained, as with metering pipes 77 and 83, insofar as the rate of flow of water from compartment 22 will progressively lessen as the level of water falls below the top of pipe 130.

The metering pipe 135 of FIG. 7 follows the same principle in having provided in the wall thereof, metering holes or openings 137 which have the greatest diameter adjacent the top of pipe 135. As the openings 137 extend away from the top of pipe 135, the diameter or area of each opening becomes progressively smaller. When the level of the water is above 135, the rate of flow from compartment 22 is the greatest, and the flow becomes progressively less as the level of water approaches the floor of compartment 22.

In the operation of the coffeemaker described hereinabove, when it is desired to brew several cups of coffee, for example 12 cups, the tray holder 90 is removed and filter paper is placed within filter holder 95. The requisite scoops of coffee grounds, probably one scoop per cup, is deposited in the filter paper and a bed of coffee grounds higher than the uppermost level of outgoing orifices 97 in filter holder 95 results. The tray holder then is replaced, making certain that projection 119 of carafe cover 117 is engaged to open valve 113. Cap 43 is than rotated and removed from opening 37 of heating compartment 20. The chamber 35 is then filled with water until the level thereof reaches the stepped portion 41 of indicator 39 bearing the reference character 12. Cap 43 is then rethreaded onto top 16 rendering chamber 35 of heating compartment 20, substantially airtight. Switch 97 is actuated to connect heater 45 to its source of electrical current to energize same and to impart heat to the water. As the water is heated to near its boiling point, to a predetermined desired temperature, hot air and steam flow through orifice 67 of pressure venting tube 61, initially relieving the pressure within chamber 35. Eventually, the desired temperature of the water and the discharging pressure coincide, whereupon the water in chamber 35 is driven by the pressure therein upwardly through bight portion 59 and out of heating compartment 20 into compartment 22. The time in which chamber 35 is emptied of the heated water is very short and occurs almost immediately. Water compartment 22 then is quickly filled with water that extends above the top of metering pipe 77. Inasmuch as the water commences to exit compartment 22 through all of metering means 75, a large amount of water quickly is dumped into coffee brewing compartment 26 to inundate the bed of coffee grounds therein. As clearly shown by the graph in FIG. 10, the rate of flow from compartment 22 becomes less and less, but yet, it supplies a continuing stream of replenishment water to the bed of coffee grounds. The out-flow openings 97 are dimensioned and positioned within filter holder 95 to provide a rate of flow of brewed coffee therefrom which balances with the rate of flow of water from compartment 22. This results in maintaining a level of water in coffee brewing compartment 26 sufficient to provide the proper ratio of coffee grounds to water and to maintain the desired residence time of water in contact with the coffee grounds as graphically illustrated in FIG. 11. The brewed coffee then flows outside of filter holder 95 and along the walls and bottom of compartment 26 for discharge through opened valve 113, and opening 118, into carafe 28. Carafe 28 then may be removed from base 14 and coffee therefrom poured into cups to be drunk by the consumer.

From the foregoing, it will be apparent that the present invention provides an automatic flow control coffeemaker which can be mass produced and one which closely simulates the "manual" process of coffee making most favored by coffee connoisseurs. Physical principles are relied upon and utilized to provide simple and inexpensive structure to accomplish the most demanding task of providing brewed coffee meeting the exacting specifications of such connoisseurs.

Although certain embodiments of the invention have been described herein, it may be readily understood that other variations of the invention may be practiced which still will be embraced by the spirit of the invention and covered by the claims which follow hereafter.

What is claimed is:

1. Apparatus for brewing coffee, comprising,
   a substantially sealed heating compartment adapted to be provided with water to be heated therein,
   a water holding compartment in communication with the heating compartment to receive heated water therefrom,
   a U-shaped syphon tube in communication with the water in said heating compartment and with the water holding compartment to discharge heated water from the heating compartment into said holding compartment when the pressure within the heating compartment reaches a predetermined value,
   heating means for imparting heat to the water in said heating compartment for bringing the water to a condition wherein the pressure within the heating chamber reaches said predetermined value but the temperature of the water is at a value less than that desired for water to be discharged into said holding compartment,
   a hollow pressure venting tube in said heating compartment having one end projecting above the level of the water in said compartment and provided with a predetermined size orifice at said one end and having its other end exposed to the pressure within said holding compartment, said pressure venting tube being operable to modify said condition to delay the attainment of said predetermined pressure until the water in said heating compartment reaches said desired temperature, whereby water at said predetermined temperature and pressure is discharged into said holding compartment,
   a coffee brewing compartment in communication with said holding compartment for receiving the water at said predetermined temperature,
   metering means for said holding compartment for regulating the rate of flow of heated water from said holding compartment into said coffee brewing compartment, wherein the metering means comprises orifice means disposed in said holding compartment for varying the rate of flow of water into said brewing compartment as a function of the level of water in said holding compartment,
   said coffee brewing compartment being adapted to contain a bed of coffee grounds for soaking contact with said water, and outlet means for said coffee brewing compartment to discharge brewed coffee therefrom.

2. The apparatus of claim 1, wherein the orifice means are dimensioned to provide for the greatest rate of flow of water from said holding compartment when the level of water is the highest in said holding compartment and successively reducing the flow rate as the water flows out of the holding compartment.

3. The apparatus of claim 2, wherein the effective aggregate area of the orifice means, as presented to the water in the holding compartment, is greatest when the largest number of cups of coffee are to be brewed and progressively less as a smaller number of cups of coffee are to be brewed.

4. The apparatus of claim 1, wherein the orifice means comprises a plurality of apertures formed in the floor of the holding compartment and a vertically disposed tubular conduit having one end secured to said floor and the other end extending above said floor and having an opening for permitting flow of water from said holding compartment through said tubular conduit.

5. The apparatus of said claim 4, wherein the opening in the tubular

6. The apparatus of claim 1, wherein the orifice means comprises a plurality of apertures formed in the floor of the holding compartment, and a pair of vertical open ended tubular conduits each has its lower ends secured to said floor and their upper ends in proximity to the top of said holding chamber, one of said pair of conduits being higher than the other of said pair.

7. The apparatus of claim 6, wherein the internal diameter of the higher conduit is greater than the other conduit of said pair.

8. The apparatus of claim 6, wherein the apertures in the floor of said holding compartment are concentrically arranged with respect to the higher conduit.

9. The apparatus of claim 1, wherein the outlet means comprises a spring biased valve in the bottom of the brewing compartment which is biased to an open position when a carafe if placed into cooperative relationship with the brewing compartment to receive brewed coffee therefrom.

* * * * *

UNITED STATES PATENT AND TRADEMARK OFFICE
CERTIFICATE OF CORRECTION

PATENT NO. : 5,168,794

DATED : December 8, 1992

INVENTOR(S) : Dov Z, Glucksman

It is certified that error appears in the above-identified patent and that said Letters Patent is hereby corrected as shown below:

Column 10, line 68,
Claim 5, line 2, after "tubular" insert -- conduit is dimensioned to permit greater flow of water into said tubular member when the water level in said holding compartment is at a higher level than when it is at a lower level. --

Signed and Sealed this

Nineteenth Day of October, 1993

Attest:

BRUCE LEHMAN

Attesting Officer

Commissioner of Patents and Trademarks